United States Patent
Serban et al.

(12)

(10) Patent No.: US 11,460,427 B2
(45) Date of Patent: Oct. 4, 2022

(54) CHEMIRESISTOR HUMIDITY SENSOR AND FABRICATION METHOD THEREOF

(71) Applicant: Cyberswarm, Inc., Ploiesti (RO)

(72) Inventors: Bogdan Catalin Serban, Bucharest (RO); Octavian Buiu, Bucharest (RO); Octavian Ionescu, Ploiesti (RO); Andrei Buiu, Bucharest (RO)

(73) Assignee: Cyberswarm, Inc., Ploiesti (RO)

( * ) Notice: Subject to any disclaimer, the term of this patent is extended or adjusted under 35 U.S.C. 154(b) by 871 days.

(21) Appl. No.: 16/176,628

(22) Filed: Oct. 31, 2018

(65) Prior Publication Data

US 2019/0128828 A1   May 2, 2019

Related U.S. Application Data

(60) Provisional application No. 62/579,227, filed on Oct. 31, 2017.

(51) Int. Cl.

| G01N 27/12 | (2006.01) |
| C08G 81/02 | (2006.01) |
| C08B 15/02 | (2006.01) |
| C08G 81/00 | (2006.01) |
| C08G 73/02 | (2006.01) |
| C08B 5/14 | (2006.01) |

(Continued)

(52) U.S. Cl.
CPC ............. *G01N 27/126* (2013.01); *C08B 5/14* (2013.01); *C08B 15/02* (2013.01); *C08B 31/063* (2013.01); *C08G 73/02* (2013.01); *C08G 73/0266* (2013.01); *C08G 81/00* (2013.01); *C08G 81/024* (2013.01); *C08L 1/16* (2013.01); *C08L 3/06* (2013.01); *G01N 27/121* (2013.01); *G01N 27/127* (2013.01)

(58) Field of Classification Search
CPC .. G01N 27/126; G01N 27/121; G01N 27/127; C08B 5/14; C08B 15/02; C08B 31/063; C08G 73/02; C08G 73/0266; C08G 81/00; C08G 81/024; C08L 1/16; C08L 3/06

See application file for complete search history.

(56) References Cited

U.S. PATENT DOCUMENTS

| 7,087,148 B1 * | 8/2006 | Blackburn .............. B82Y 30/00 |
| | | 204/403.06 |
| 8,394,330 B1 | 3/2013 | Lewis et al. |

(Continued)

FOREIGN PATENT DOCUMENTS

| EP | 1302506 | 4/2003 |
| EP | 3202820 | 8/2017 |

OTHER PUBLICATIONS

Yue, Lina, et al. "Sulfonated bacterial cellulose/polyaniline composite membrane for use as gel polymer electrolyte." Composites Science and Technology 145 (2017): 122-131. (Year: 2017).*

(Continued)

*Primary Examiner* — Robert J Eom
(74) *Attorney, Agent, or Firm* — DLA Piper LLP (US)

(57) ABSTRACT

A sulfonated nanocellulose or sulfonated cellulose may be synthesized. A polyaniline emeraldine may be doped with the sulfonated nanocellulose or sulfonated cellulose to form a sulfonated nanocellulose-doped polyaniline or a sulfonated cellulose-doped polyaniline.

14 Claims, 9 Drawing Sheets

(51) Int. Cl.
*C08B 31/06* (2006.01)
*C08L 3/06* (2006.01)
*C08L 1/16* (2006.01)

(56) References Cited

U.S. PATENT DOCUMENTS

2005/0263394 A1    12/2005  Lewis et al.
2008/0221806 A1*    9/2008  Bryant ................. G01N 33/497
                                                            702/22

OTHER PUBLICATIONS

Pang, Zengyuan, et al. "Ammonia sensing properties of different polyaniline-based composite nanofibres." (2017). (Year: 2017).*
Wang, Chen-Chao, et al. "Development of near zero-order release dosage forms using three-dimensional printing (3-DP™) technology." Drug development and industrial pharmacy 32.3 (2006): 367-376. (Year: 2006).*
Shukla, S. K. "Synthesis of polyaniline grafted cellulose suitable for humidity sensing." (2012). (Year: 2012).*
International Search Report in PCT/IB/2018/058561 dated Jan. 25, 2019.
Written Opinion in PCT/IB/2018/058561 dated Jan. 25, 2019.

* cited by examiner

200

300

CHEMIRESISTOR HUMIDITY SENSOR AND FABRICATION METHOD THEREOF

CROSS-REFERENCE CROSS-REFERENCE TO RELATED APPLICATIONS

This application is based on and derives the benefit of the filing date of U.S. Patent Application No. 62/579,227, filed Oct. 31, 2017. The entire content of this application is herein incorporated by reference in its entirety.

BRIEF DESCRIPTIONS OF THE DRAWINGS

Figure 1:
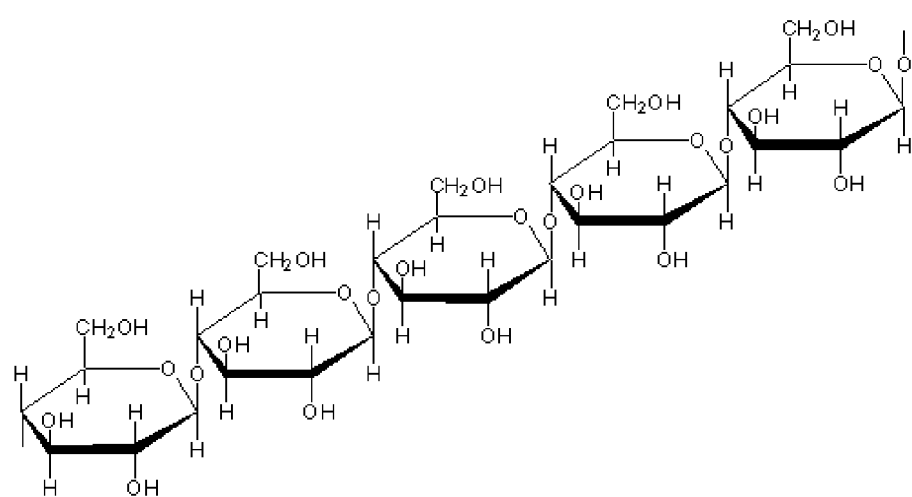
Figure 2:
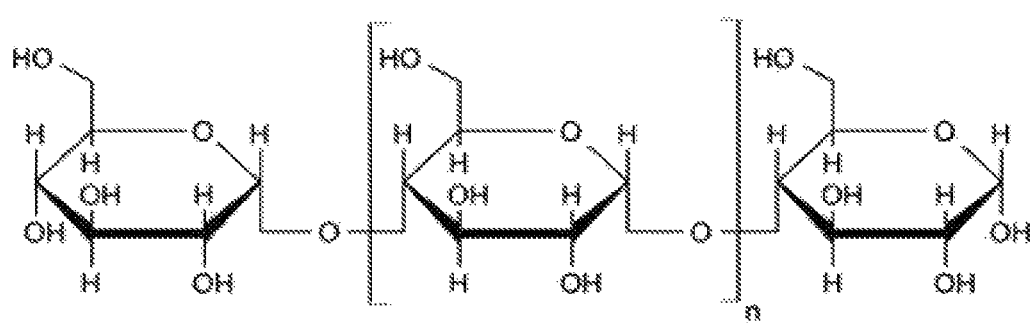
Figure 3:
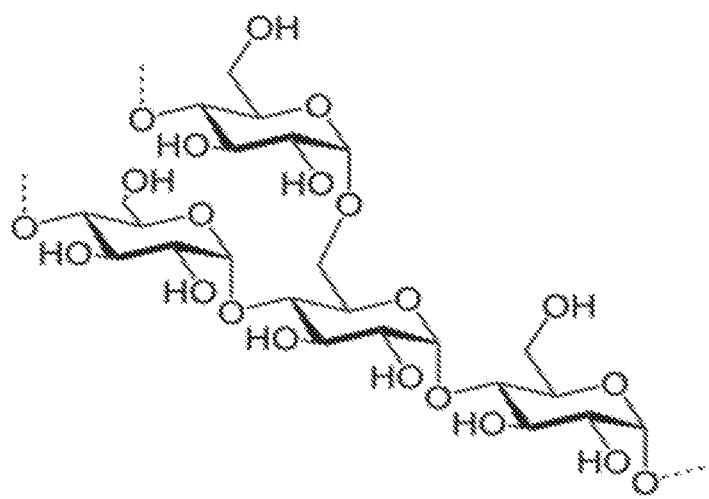
Figure 4:
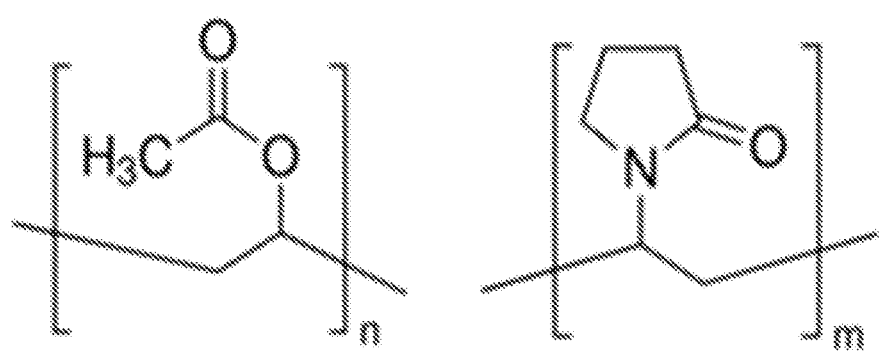
Figure 5:
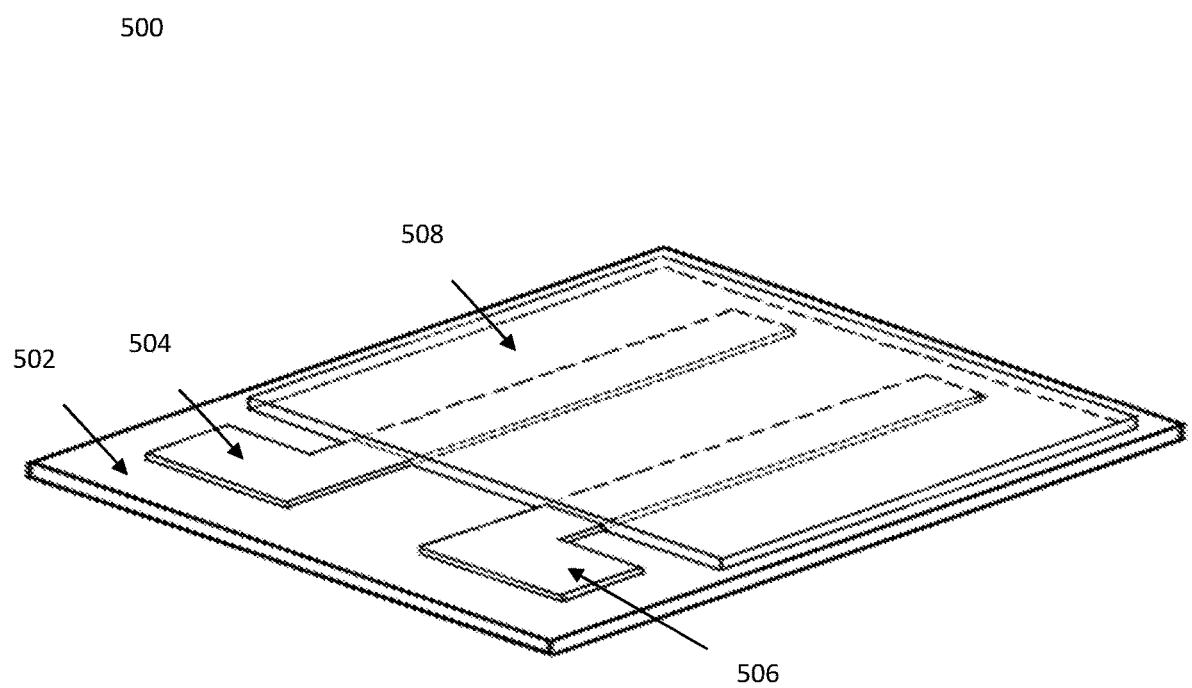
Figure 6:
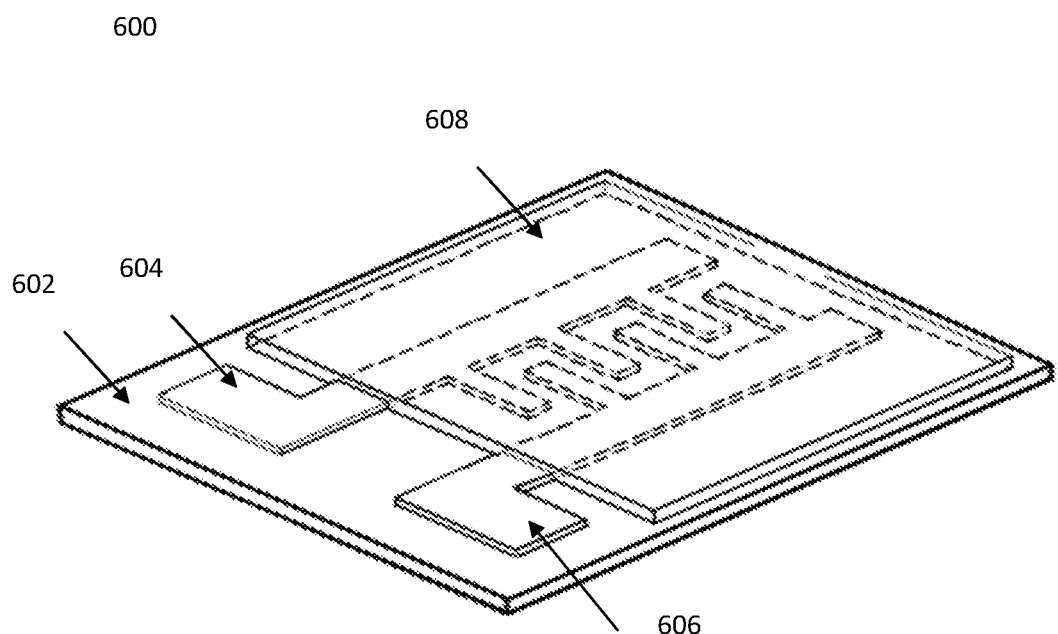
Figure 7:
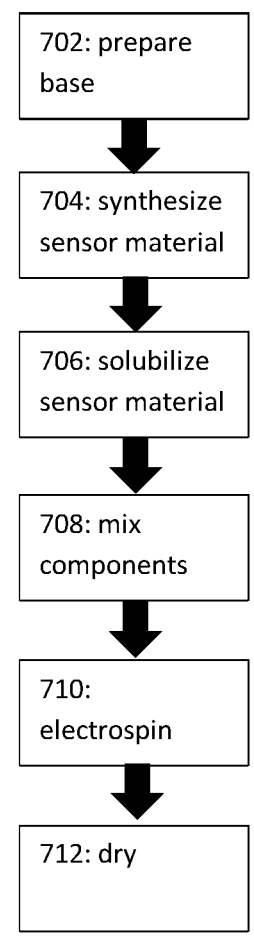
Figure 8:
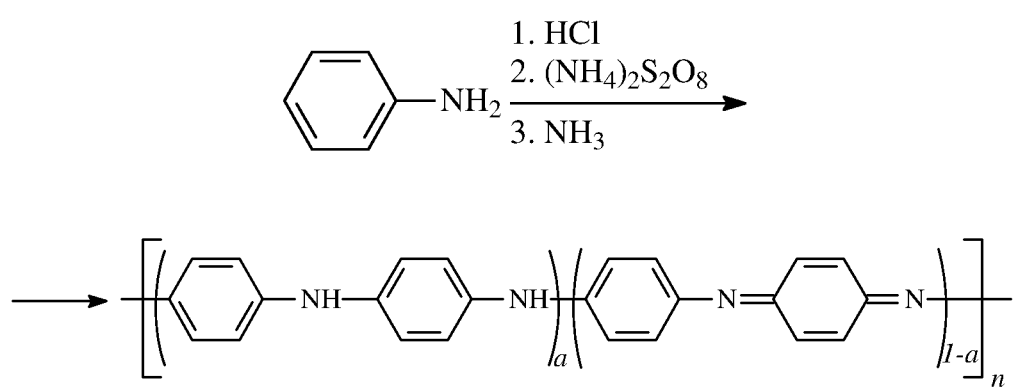
Figure 9:
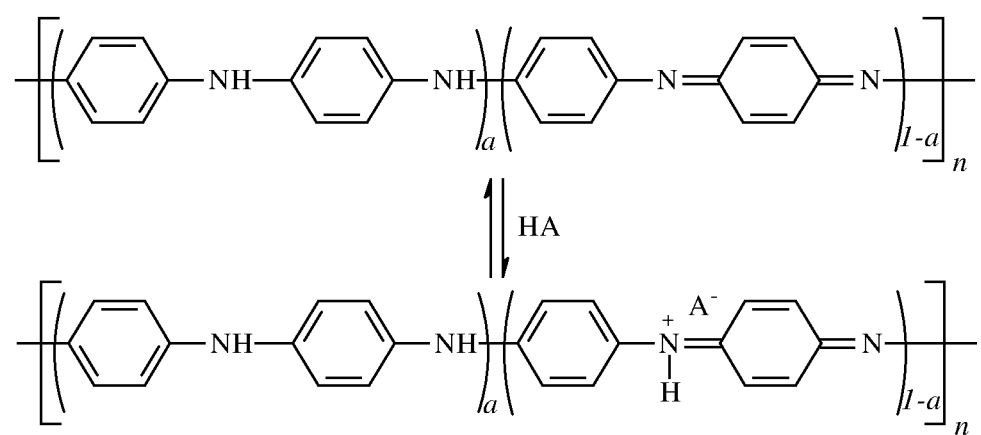

FIG. 1 shows the structure of cellulose.
FIG. 2 shows the structure of linear and helical amylose, a component of starch.
FIG. 3 shows the structure of linear and branched amylopectin, a component of starch.
FIG. 4 shows the structure of a Kollidon® SR.
FIG. 5 shows a sensor with linear, planar electrodes according to an embodiment of the disclosure.
FIG. 6 shows a sensor with interdigitated electrodes according to an embodiment of the disclosure.
FIG. 7 shows a sensor fabrication process according to an embodiment of the disclosure.
FIG. 8 shows synthesis of emeraldine according to an embodiment of the disclosure.
FIG. 9 shows synthesis of conductive polyaniline through doping of emeraldine according to an embodiment of the disclosure.

DETAILED DESCRIPTION OF SEVERAL EMBODIMENTS

Humidity sensing, control and monitoring are of paramount importance in many domestic and industrial applications such as building ventilation control, climatology, chemical gas purification, metrology, electronics, textile and paper manufacturing, food/beverage processing, medical field (e.g., incubators, respiratory equipment, pharmaceutical processing, sterilizers), automotive industry, agriculture (e.g., soil moisture monitoring, cereal storage), cosmetics, biomedical analysis, etc. Various types of humidity sensors have been designed and developed such as optical, gravimetric, magnetoelastic, capacitive, resistive, piezoresistive, surface plasmon resonance sensors, etc. Among the types of sensors used in the control and monitoring of humidity, chemiresistive sensors may be an attractive option due to their excellent linear response and simplicity. Moreover, these sensors may be appropriate for the vast majority of humidity measurement requirements. Numerous materials used as sensing elements have been developed for manufacturing chemiresistor humidity sensors. The use of organic polymers and their composites as sensing layers in the design of chemiresistor humidity sensor is one of the most used technical choices for humidity measurements. Along with polyelectrolytes, conductive polymers such as poly(3, 4-ethylenedioxythiophene) (PEDOT) or poly (3,4-ethylenedioxythiophene) polystyrene sulfonate (PEDOT-PSS), polyaniline have been extensively used in chemiresistive humidity sensor manufacturing.

Nanocellulose may be used in some sensor manufacturing embodiments due to its thermal and mechanical properties, inherent abundance, renewability and sustainability, biodegradability, flexibility, low density, optical transparency, etc. Moreover, nanocellulose may be processed into thin films. Some example techniques for the preparation of thin films and coatings of cellulose nanocrystals may include solvent casting, spin-coating, dip-coating, Langmuir-Schaefer deposition technique, etc. Some humidity sensors may be based on polyanilinenanofibres. Example methods of synthesis of polyanilines nanofibers may include interfacial synthesis, electrospinning, nanofiber seeding, electrosynthesis, etc. The polyanilinenanofibers used as sensing layers may exhibit superior performances in comparison to conventional thin films. Their high surface area, high porosity, and small diameters may enhance diffusion of water molecules and dopants into the nanofibers, for example.

Some embodiments disclosed herein may provide synthesis of conductive polyanilines nanofibers that may be sensitive to variation of relative humidity. The synthesized polyanilines nanofibers may have hydrophilic properties, porous structure, and/or improved mechanical stability.

Doping agents used for the synthesis of conductive polyanilines may be based on cellulose, an example 100 of which is shown in FIG. 1, and/or starch (amylose 200 as shown in FIG. 2 and/or amylopectin 300 as shown in FIG. 3). Doping agents may include sulfonated nanocellulose (abbreviated as Nanocel-SO3H), sulfonated cellulose (abbreviated as Cel-SO3H), sulfonated nanostarch (abbreviated as Nanostarch-SO3H), and/or sulfonated starch (abbreviated as Starch-SO3H).

The sensing layer used for the manufacturing of chemiresistive humidity sensors may include nanocomposite doped polyaniline nanofiber-Kollidon® SR. Kollidon® SR is a blend of polyvinyl acetate and povidone (K 30) in the ratio 8:2 used due to film forming properties, and an example 400 is shown in FIG. 4.

The synthesized and used doped polyanilines nanofibers may include Nanocel-$SO_3$H-doped polyanilines, Cel-$SO_3$H-doped polyanilines, Nanostarch-$SO_3$H-doped polyaniline, and/or Starch-$SO_3$H-doped polyaniline.

Sensing layers made from the aforementioned materials may exhibit the following properties in some embodiments:

1) NanoCel-SO3H, Cel-SO3H, NanoStarch-SO3H, and Starch-SO3H are poly-dopants and may contain a large amount of sulfonic groups (e.g., strong Brønsted acid). These doping agents may be able to protonate iminic nitrogen atoms from the emeraldine structure and may lead to stable conductive polyanilines.

2) The size of the doping agent may affect the stability of doped-PANI. Due to larger molecular size dopants (Nano-Cel-$SO_3$H, Cel-$SO_3$H, NanoStarch-$SO_3$H, Starch-SO3H), the synthesized conductive polymers may be less susceptible to de-doping. Thus, the stability of the Nanocel-$SO_3$H-doped polyanilines, Cel-$SO_3$H-doped polyanilines, Nanostarch-$SO_3$H-doped polyaniline and Starch-$SO_3$H-doped polyaniline film may be significantly higher than that of PANI films doped with other ions.

3) The starting materials for the synthesis of the doping agents (cellulose, nanocellulose, starch, nanostarch) may be hygroscopic, biodegradable, low-cost, controlled porosity (e.g., in the case of nanocellulose, and nano starch), and may improve mechanical stability and processability of polyanilines.

4) Kollidon® SR may be hygroscopic, may have film-forming properties, and may improve mechanical stability of the polyanilines.

FIG. 5 shows a sensor 500 with linear, planar electrodes 504 and 506 according to an embodiment of the disclosure. The relative humidity sensor 500 according to some embodiments may include a first electrode 504 and a second electrode 506 disposed above a dielectric substrate 502 and a sensitive layer 508 disposed above the first electrode 504 and the second electrode 506. The dielectric substrate 502 may be formed from plastic such as polycarbonate (Lexane), Kapton and polyethylene terephthalate (PET), glass, composite materials such as FR4, semiconductor material wafers such as silicon wafers, etc. The dielectric substrate 502 may have a thickness from 60 microns to 6 microns. The electrodes 504 and 506 may be deposited onto the surface of the dielectric substrate 502 by using different methods such as sputtering, direct printing, evaporation, etc. The electrodes 504 and 506 may be made from conductive materials such as such as aluminum, copper, chromium, etc. The electrodes 504 and 506 may be made from the same material as one another or may be formed of different materials.

FIG. 6 shows a sensor 600 with interdigitated electrodes 604 and 606 according to an embodiment of the disclosure. The relative humidity sensor 600 according to some embodiments may include a first electrode 604 and a second electrode 606 disposed above a dielectric substrate 602 and a sensitive layer 608 disposed above the first electrode 608 and the second electrode 606. The dielectric substrate 602 may be formed from plastic such as polycarbonate (Lexane), Kapton and polyethylene terephthalate (PET), glass, composite materials such as FR4, semiconductor material wafers such as silicon wafers, etc. The dielectric substrate 602 may have a thickness from 60 microns to 6 microns. The electrodes 604 and 606 may be deposited onto the surface of the dielectric substrate 602 by using different methods such as sputtering, direct printing, evaporation, etc. The electrodes 604 and 606 may be made from conductive materials such as such as aluminum, copper, chromium, etc. The electrodes 604 and 606 may be made from the same material as one another or may be formed of different materials.

FIG. 7 shows a sensor fabrication process 700 according to an embodiment of the disclosure. Process 700 may be performed to fabricate a sensor 500 or sensor 600 using any combination of materials noted above. For example, the following disclosure will refer to FIG. 7 in describing design of the sensing layer based on NanoCel-SO3H-doped polyaniline-Kollidon® SR nanocomposite (first sample process) and separately refer to FIG. 7 in describing design of the sulfonated starch-doped polyaniline-Kollidon® SR sensing layer (second sample process).

In the first sample process, at 702, undoped PANI (free base) may be prepared by chemically oxidizing aniline with ammonium peroxydisulfate. For example, FIG. 8 shows synthesis 800 of emeraldine according to an embodiment of the disclosure. The aniline (9.32 g, 0.1 mol) may be dissolved in 300 ml of water. 50 ml of 37.5% hydrochloric acid may be added in the solution. The mixture may be stirred in an ice bath for two hours. After the addition of ammonium peroxydisulfate (34.2 g, 0.15 mol), the new mixture may be covered and placed in a refrigerator at 4° C. for five hours. Afterwards, the mixture may be diluted in water, the PANI precipitate may be filtered, washed with 1, 5 L of distilled water, washed again with a solution of 30% ammonium hydroxide and, finally, washed for a second time with distilled water. The powder may be dried in an oven, at 85° C., for three hours.

In the first sample process, at 704, sulfonated nanocellulose may be synthesized using microcrystalline cellulose as precursor. For this purpose, a volume of 25 mL of sulfuric acid may be added dropwise to a magnetically stirred slurry containing 5 g of microcrystalline cellulose in 50 mL of deionized water at 0° C., followed by warming to 50° C. for 10 hours and then cooling to room temperature. The dispersion may be filtered and washed with distilled water, and the solid may be dried at 50° C. for 10 hours.

In the first sample process, at 706, 0.6 g sulfonated nanocellulose may be solubilized in 150 mL dimethylformamide. PANI in the emeraldine form (0.6 g) may be placed in the previous solution of sulfonated nanocellulose in dimethylformamide and stirred for 24 hours at room temperature. After that, the doped PANI may be filtered and rinsed with water and tetrahydrofurane in order to remove the unreacted sulfonated nanocellulose. FIG. 9 shows synthesis 900 of conductive polyaniline through doping of emeraldine according to an embodiment of the disclosure (where HA stands for sulfonated nanocellulose or NanoCel-SO3H).

Doping of emeraldine may be performed in solid state in some embodiments. Polyaniline, as emeraldine base, and sulfonated nanocellulose may be mechanically blended with a pestle in an agate mortar for 15 minutes. Then the mixture may be heated at three different temperatures (40° C., 60° C., and 80° C.).

In the first sample process, at 708, 0.6 g sulfonated nanocellulose-doped polyaniline and 0.2 g Kollidon® SR may be added in 300 ml etanol, then the mixture may be subjected to magnetic stirring for 8 hours.

With the materials thus prepared, manufacturing of the chemiresistive humidity sensor may be performed at 710 and 712.

In the first sample process, at 710, the final solution from 708 may be deposited by electrospinning using the dielectric substrate 502 or 602 with linear or interdigitated electrodes 504/506 or 604/606 as collectors. In some embodiments, the final solution may be deposited through drop casting and/or ink-jet printing techniques.

In the first sample process, at 712, the sensing layer 508 or 608 formed at 710 may be dried in air at 70° C. for 40 minutes.

In the second sample process, at 702, undoped PANI (free base) may be prepared by chemically oxidizing aniline with ammonium peroxydisulfate. For example, FIG. 8 shows synthesis 800 of emeraldine according to an embodiment of the disclosure. The aniline (13, 98 g, 0.15 mol) may be dissolved in 400 ml of water. 60 ml of 37.5% hydrochloric acid may be added in the solution. The mixture may be stirred in an ice bath for two hours. After the addition of ammonium peroxydisulfate (22.8 g, 0.1 mol), the new mixture may be covered and placed in a refrigerator at 4° C. for five hours. Afterwards, the mixture may be diluted in water, the PANI precipitate may be filtered, washed with 1 liter of distilled water, washed again with a solution of 30% ammonium hydroxide, and, finally, washed for a second time with distilled water. The powder may be dried in an oven at 90° C. for three hours.

In the second sample process, at 704, synthesis of sulfonate starch may be performed using starch and chlorsulfonic acid as starting materials.

In the second sample process, at 706, 0.7 g sulfonate starch may be solubilized in 150 mL N-methyl pirrolidone. PANI in the emeraldine form (0.6 g) may be placed in the previous solution of sulfonated starch in N-methyl pirrolidone and stirred for 24 hours at room temperature. After that, the doped PANI may be filtered and rinsed with water and tetrahydrofurane in order to remove the unreacted sulfonated starch.

Doping of emeraldine may be performed in solid state in some embodiments. Polyaniline, as emeraldine base, and sulfonated starch may be mechanically blended with a pestle in an agate mortar for 20 minutes. Then the mixture may be heated at three different temperatures (40° C., 60° C., and 80° C.).

In the second sample process, at 708, 0.6 g sulfonated starch-doped polyaniline and 0.2 g Kollidon® SR may be added in 300 ml etanol, then the mixture may be subjected to magnetic stirring for 8 hours.

With the materials thus prepared, manufacturing of the chemiresistive humidity sensor may be performed at 710 and 712.

In the second sample process, at 710, the final solution from 708 may be deposited by electrospinning using the dielectric substrate 502 or 602 with linear or interdigitated electrodes 504/506 or 604/606 as collectors. In some embodiments, the final solution may be deposited through drop casting and/or ink-jet printing techniques.

In the second sample process, at 712, the sensing layer 508 or 608 formed at 710 may be dried in air at 80° C. for 50 minutes.

In some embodiments, a sensor 500 or 600 produced by any variant of process 700 may have one or more of the following properties. Sensor 500 or 600 may include a nanocomposite synthesized as described above and characterized in that the composition comprises 80 to 85% by weight sulfonated nanocellulose-doped polyaniline and 15 to 20% by weight Kollidon® SR based on the total weight of the composition. Sensor 500 or 600 may include a nanocomposite synthesized as described above and characterized in that the composition comprises 80 to 85% by weight sulfonated nanocellulose-doped polyaniline and 15 to 20% by weight Kollidon® SR based on the total weight of the composition. Sensor 500 or 600 may include a nanocomposite having a length of 50 nanometers to 100 nanometers and/or including nanofibers having lengths of 50 nanometers to 100 nanometers. Sensor 500 or 600 may include a dielectric substrate 502 or 602 having a thickness from 60 microns to 6 microns. Sensor 500 or 600 may include electrodes 504/506 or 604/606 deposited onto the surface of the dielectric substrate 502 or 602 by using sputtering, direct printing, evaporation, etc. Performance of the sensor 500 or 600 may be tested by applying a voltage between the two electrodes 504/506 or 604/606 and measuring the electrical current flowing through the sensing layer 508 or 608 at various levels of humidity.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method comprising:
   synthesizing a sulfonated nanocellulose;
   doping a polyaniline emeraldine with the sulfontated nanocellulose to form a sulfonated nanocellulose-doped polyaniline, wherein the doping is performed at room temperature in dimethylformamide; and
   synthesizing a sulfonated nanocellulose-doped polyaniline-Kollidon® SR nanocomposite from the sulfonated nanocellulose-doped polyaniline.

2. The method of claim 1, wherein the synthesizing of the sulfonated nanocellulose-doped polyaniline-Kollidon® SR nanocomposite is performed in ethanol, under magnetic stirring, for 8 hours.

3. The method of claim 1, wherein the sulfonated nanocellulose-doped polyaniline-Kollidon® SR nanocomposite comprises 80% to 85% by weight sulfonated nanocellulose-doped polyaniline and 15% to 20% by weight Kollidon® SR based on a total weight of the nanocomposite.

4. The method of claim 1, further comprising depositing the nanocomposite to a substrate having at least two electrodes formed thereon to form a sensing layer.

5. The method of claim 4, wherein the substrate comprises a polycarbonate.

6. The method of claim 4, wherein the at least two electrodes are formed in a linear pattern or an interdigitated pattern.

7. The method of claim 4, wherein the deposited nanocomposite has a length of 50 nanometers to 100 nanometers.

8. The method of claim 4, wherein the depositing is performed by at least one of electrospinning, drop casting, and inkjet printing.

9. The method of claim 4, further comprising testing the sensing layer by applying a voltage between the at least two electrodes and measuring an electrical current flowing through the sensing layer at one or more levels of humidity.

10. The method of claim 4, wherein the substrate has a thickness from 60 microns to 6 microns.

11. The method of claim 4, further comprising depositing the at least two electrodes onto a surface of the substrate by at least one of sputtering, direct printing and evaporation.

12. The method of claim 4, wherein the at least two electrodes are formed of at least one of aluminum, copper, and chromium.

13. A sensor comprising:
    the sensing layer formed by the method of claim 4;
    the substrate; and
    the at least two electrodes.

14. The sensor of claim 13, wherein a voltage between the at least two electrodes is dependent upon a humidity of an environment in which the sensor is disposed.

* * * * *